(12) United States Patent
Noh

(10) Patent No.: US 12,377,456 B2
(45) Date of Patent: Aug. 5, 2025

(54) TEE TYPE CONNECTOR PIPE MANUFACTURING METHOD

(71) Applicant: Sung Keun Noh, Suwon-si (KR)

(72) Inventor: Sung Keun Noh, Suwon-si (KR)

(73) Assignee: Sung Keun Noh, Suwon-si (KR)

( * ) Notice: Subject to any disclaimer, the term of this patent is extended or adjusted under 35 U.S.C. 154(b) by 0 days.

(21) Appl. No.: 18/571,185

(22) PCT Filed: Jun. 16, 2023

(86) PCT No.: PCT/KR2023/008340
§ 371 (c)(1),
(2) Date: Jun. 18, 2024

(87) PCT Pub. No.: WO2024/010243
PCT Pub. Date: Jan. 11, 2024

(65) Prior Publication Data
US 2024/0335869 A1    Oct. 10, 2024

(30) Foreign Application Priority Data

Jul. 4, 2022  (KR) .................... 10-2022-0081721

(51) Int. Cl.
*B21D 19/08* (2006.01)
*B21C 37/29* (2006.01)
*B21D 39/04* (2006.01)

(52) U.S. Cl.
CPC ............ *B21D 19/08* (2013.01); *B21C 37/29* (2013.01); *B21D 39/044* (2013.01)

(58) Field of Classification Search
CPC ..... B21C 37/29; B21C 37/292; B21C 37/296; B21D 28/28; B21D 28/285; B21D 19/08; B21D 39/044; Y10T 29/49442
See application file for complete search history.

(56) References Cited

U.S. PATENT DOCUMENTS

| 1,911,653 | A | * | 5/1933 | Taylor | B21C 37/292 285/133.11 |
| 2,507,859 | A | * | 5/1950 | Keller | B21C 37/292 72/370.27 |
| 2,859,870 | A | * | 11/1958 | Hitz | B21C 37/292 72/347 |
| 3,587,163 | A | * | 6/1971 | Horton | B21C 37/292 72/389.1 |

(Continued)

FOREIGN PATENT DOCUMENTS

| JP | 9-308919 A | 12/1997 |
| KR | 10-2005-0086245 A | 8/2005 |

(Continued)

OTHER PUBLICATIONS

CN 113510170A, Li et al. Oct. 2021.*

*Primary Examiner* — Edward T Tolan
(74) *Attorney, Agent, or Firm* — NSIP Law

(57) ABSTRACT

[SUMMARY]
The present invention is capable of manufacturing an integrated tee type pipe by forming a molding pipe part, with pulling a periphery of a molding hole and protruding it to the outward direction through a pressing device and a molding device, while forming a molding hole of a predetermined shape on an upper side of a straight pipe; and manufacturing a tee type pipe that ensures robustness, productivity, and workability, accordingly.

3 Claims, 17 Drawing Sheets

(56) References Cited

U.S. PATENT DOCUMENTS

| | | | | |
|---|---|---|---|---|
| 3,867,831 | A * | 2/1975 | Moshnin | B21C 37/292 |
| | | | | 72/370.23 |
| 6,044,683 | A * | 4/2000 | Shigemoto | B21C 37/292 |
| | | | | 72/370.27 |
| 9,586,248 | B1 * | 3/2017 | Ghaleb | B21C 37/292 |
| 11,292,042 | B1 * | 4/2022 | Wilson | B21C 37/292 |
| 11,583,907 | B2 * | 2/2023 | Hayase | B21C 37/292 |

FOREIGN PATENT DOCUMENTS

| | | |
|---|---|---|
| KR | 10-1344043 B1 | 1/2014 |
| KR | 10-1519365 B1 | 5/2015 |
| KR | 10-2019-0141375 A | 12/2019 |
| KR | 10-2151528 B1 | 9/2020 |
| KR | 10-2505021 B1 | 2/2023 |

\* cited by examiner

[FIG. 1]
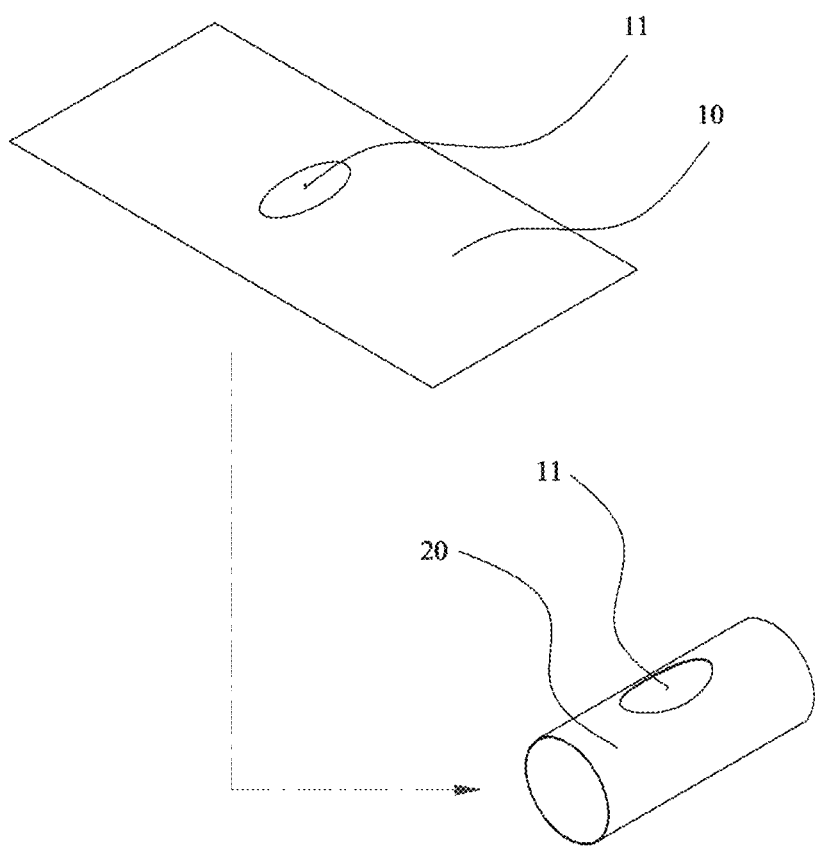

[FIG. 2]
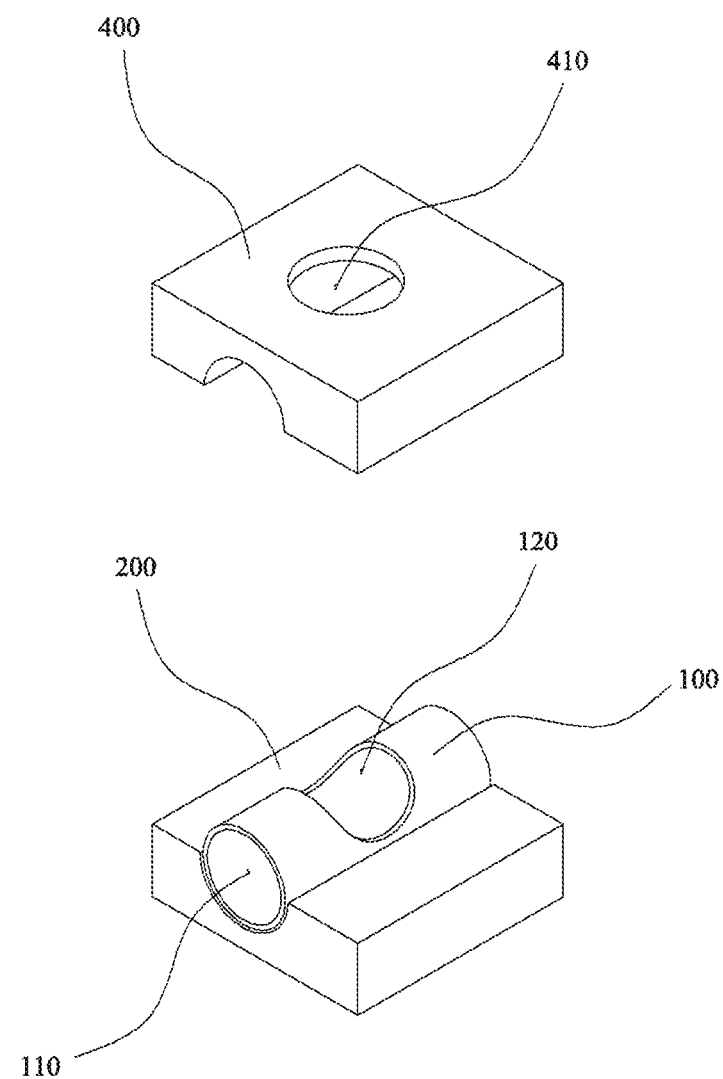

[FIG. 3]
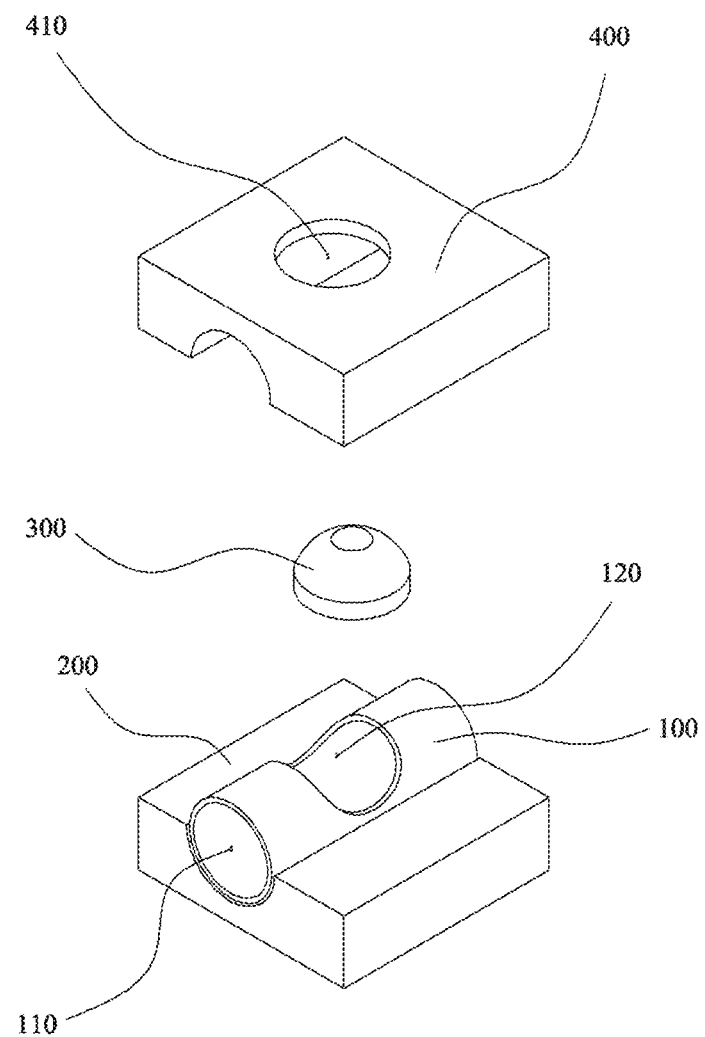

[FIG. 4]
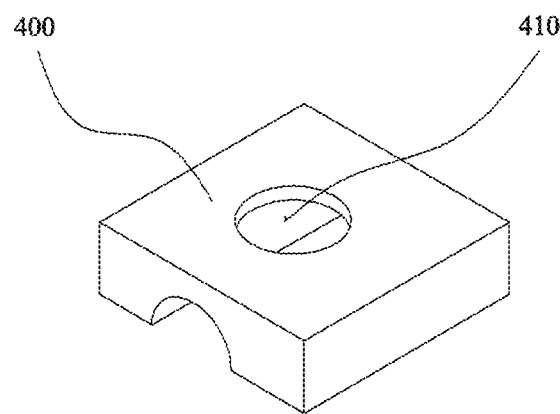
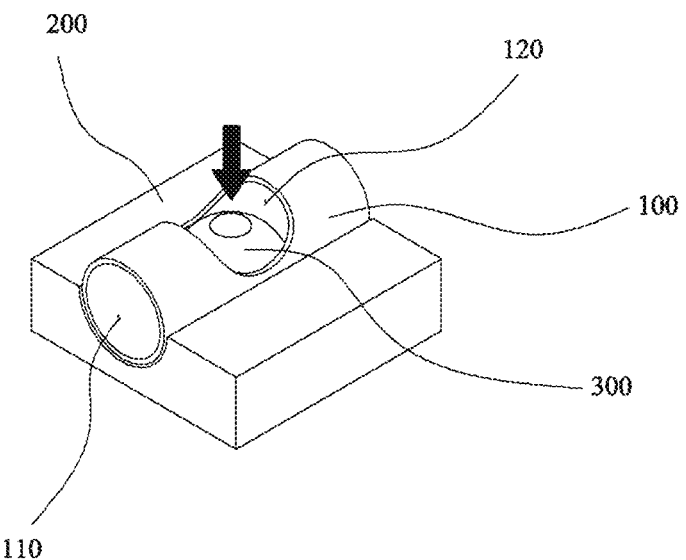

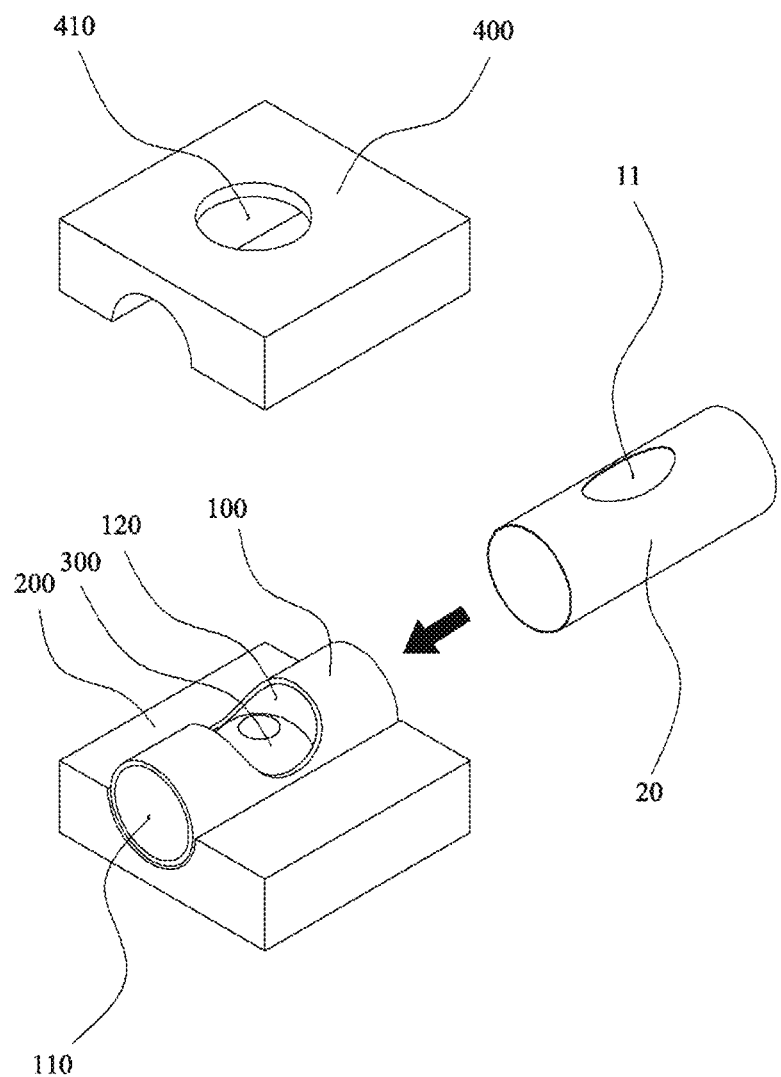
[FIG. 5]

[FIG. 6]
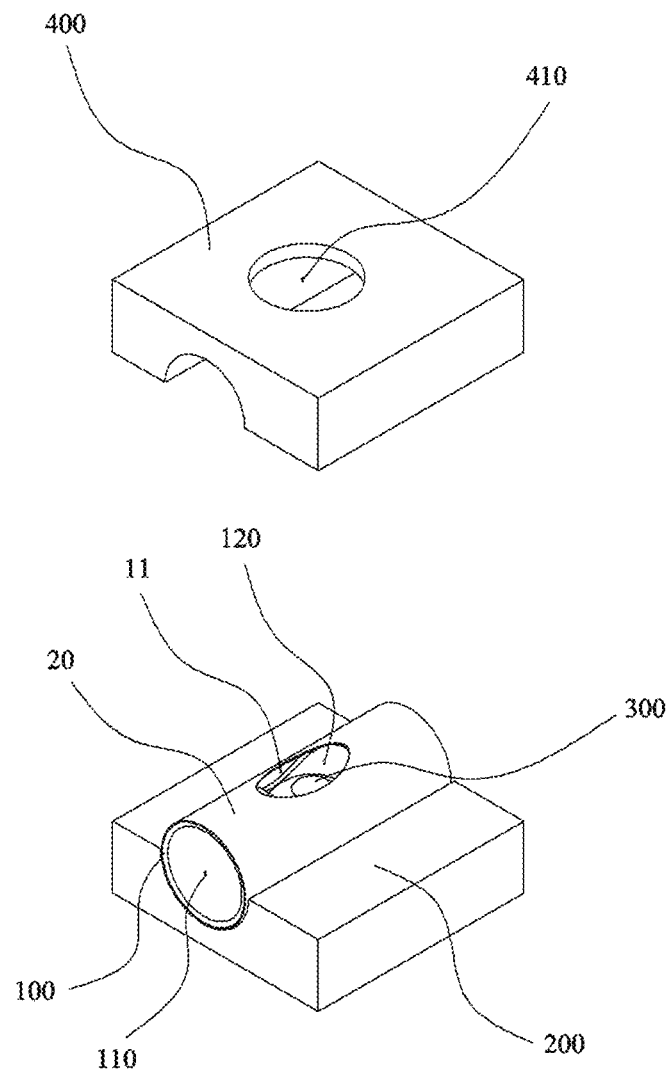

[FIG. 7]
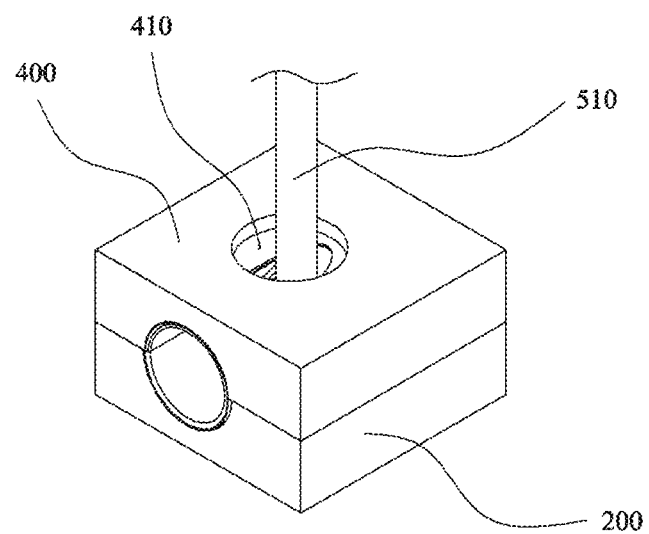

[FIG. 8]
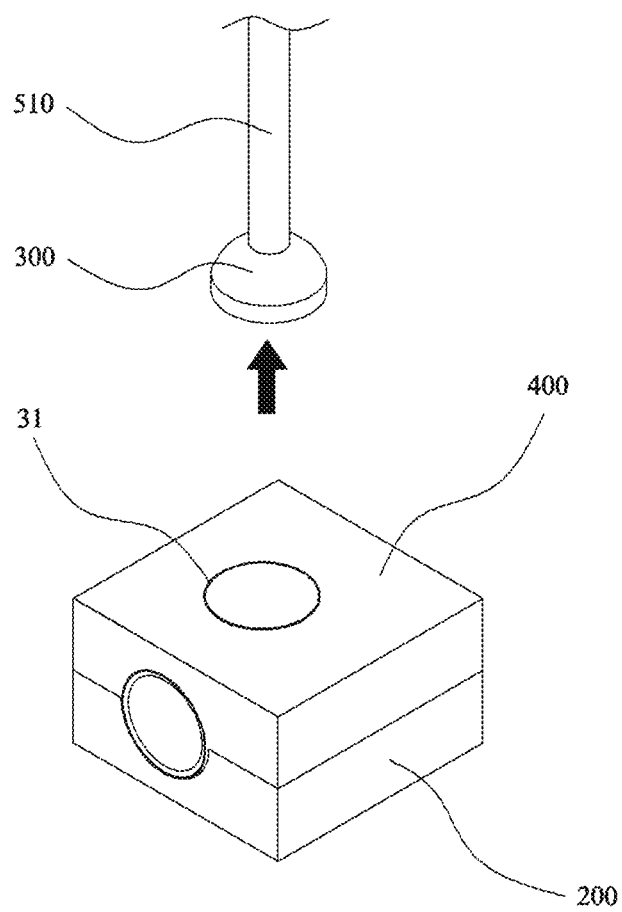

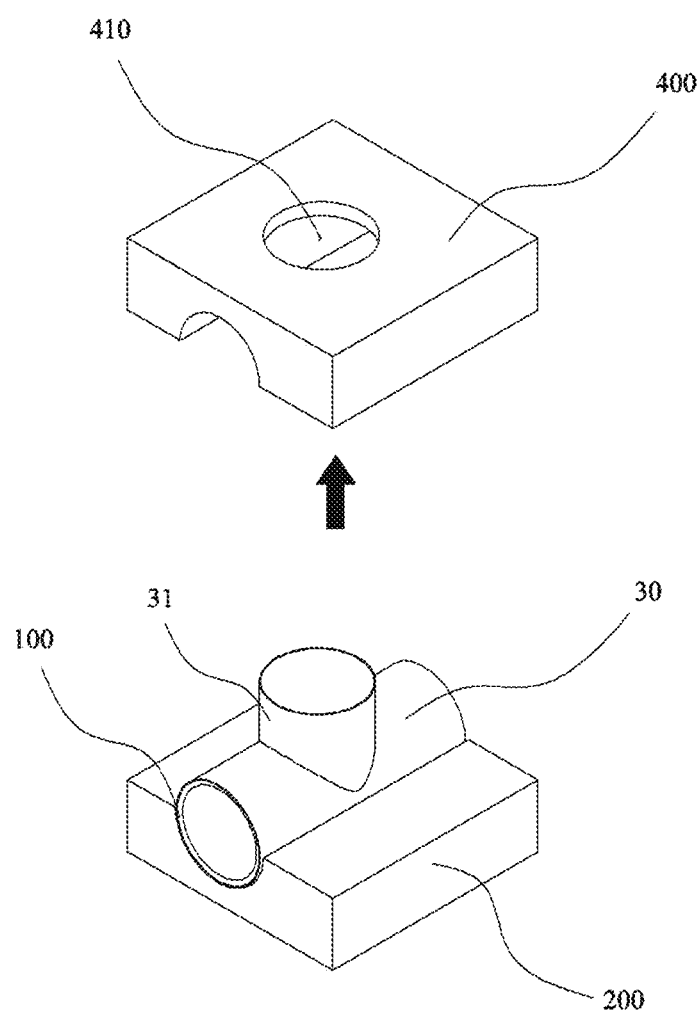
[FIG. 9]

[FIG. 10]
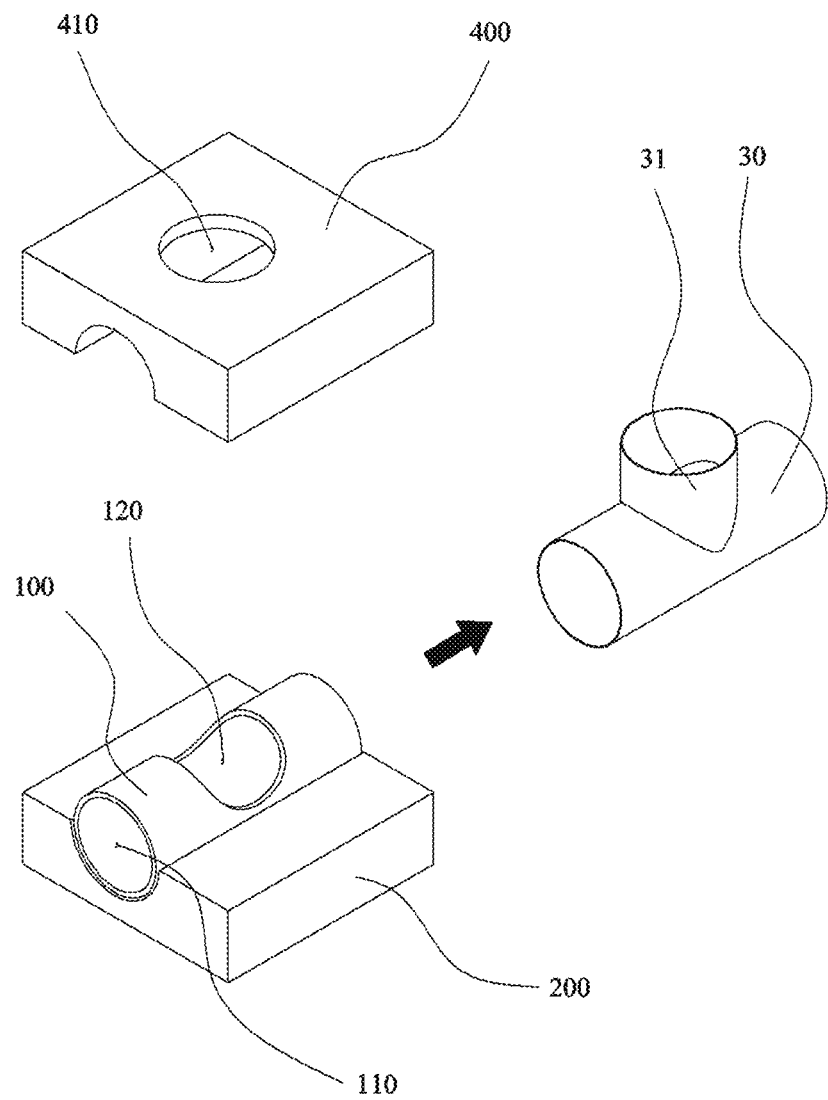

[FIG. 11]
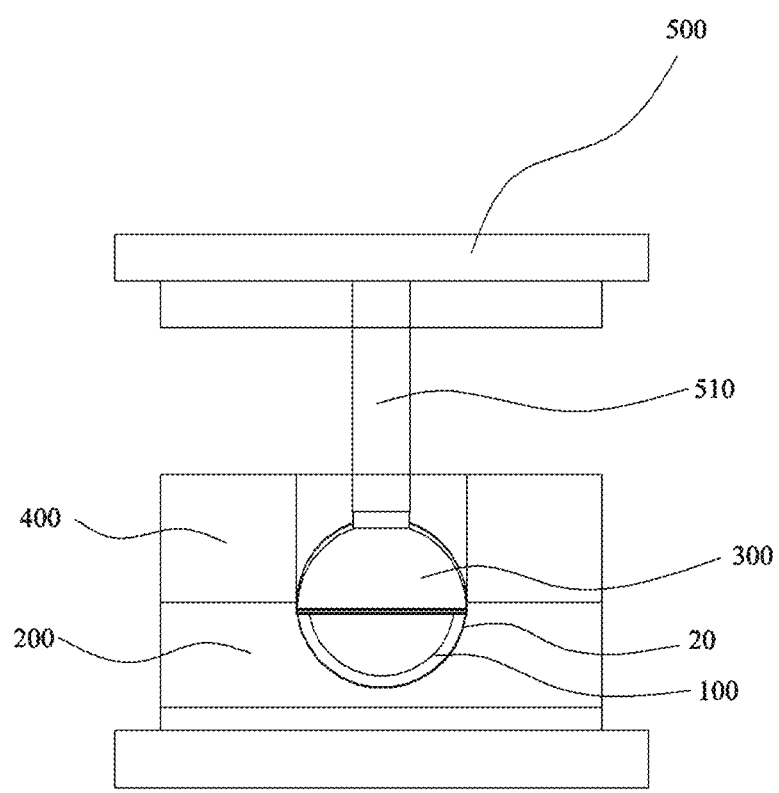

[FIG. 12]
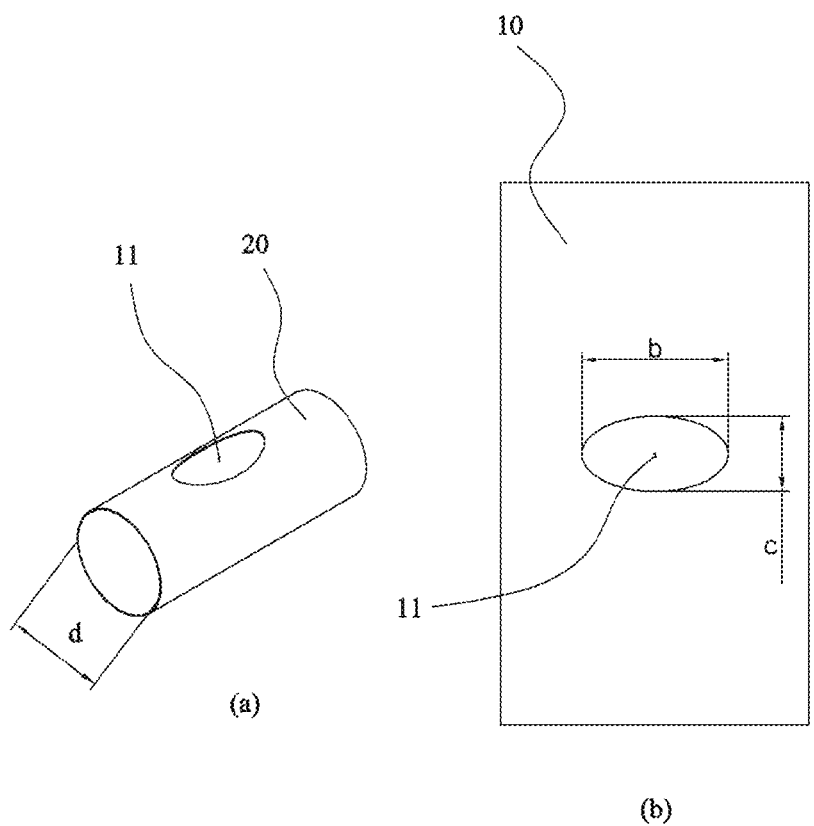

[FIG. 13]
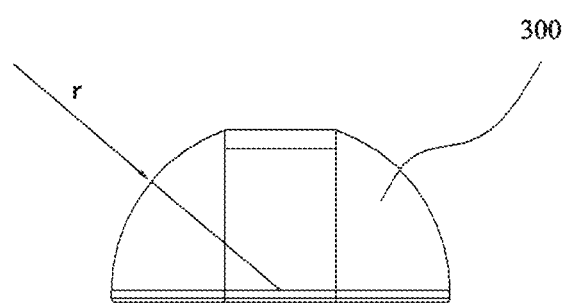

[FIG. 14]
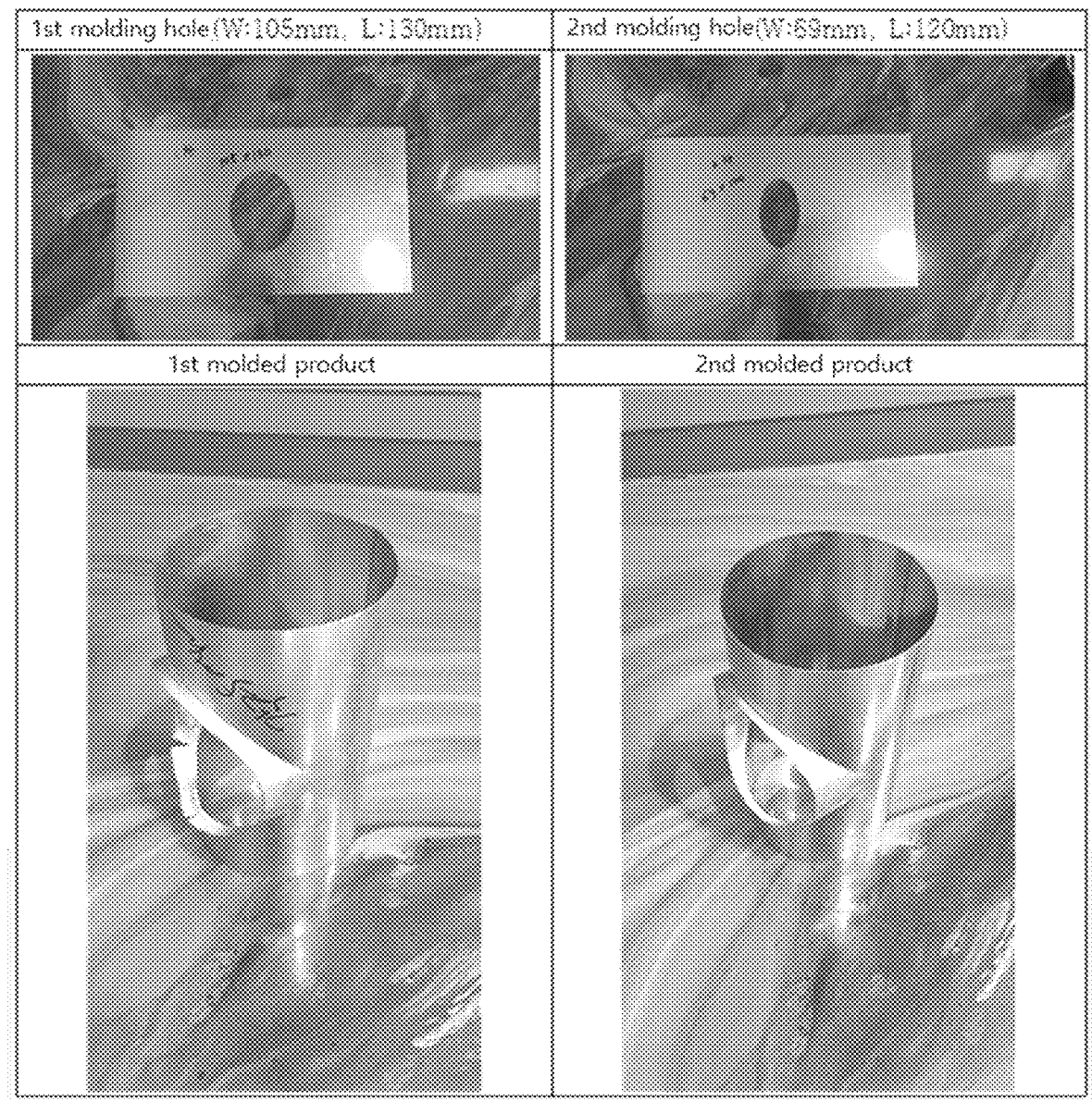

[FIG. 15]
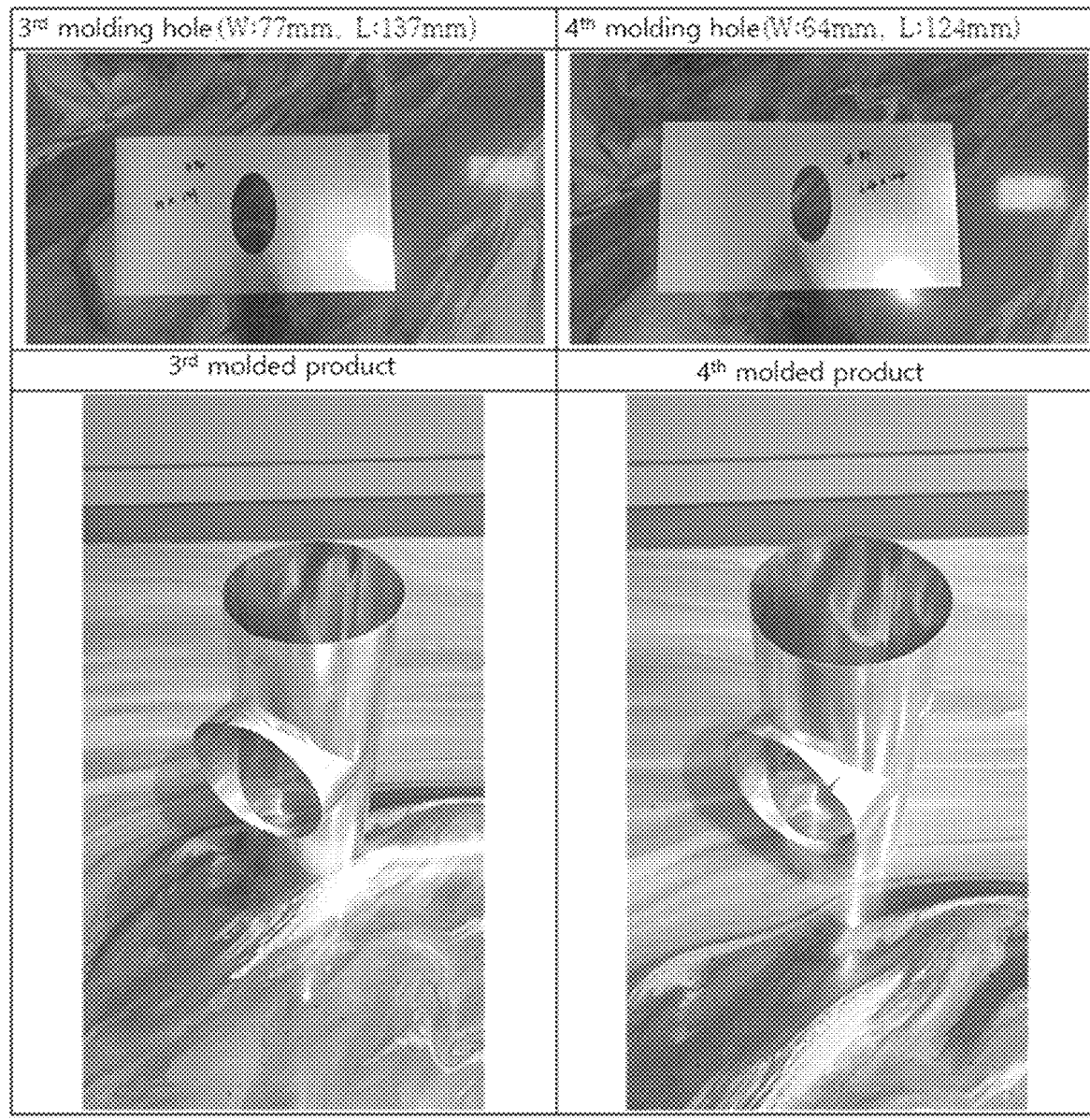

[FIG. 16]
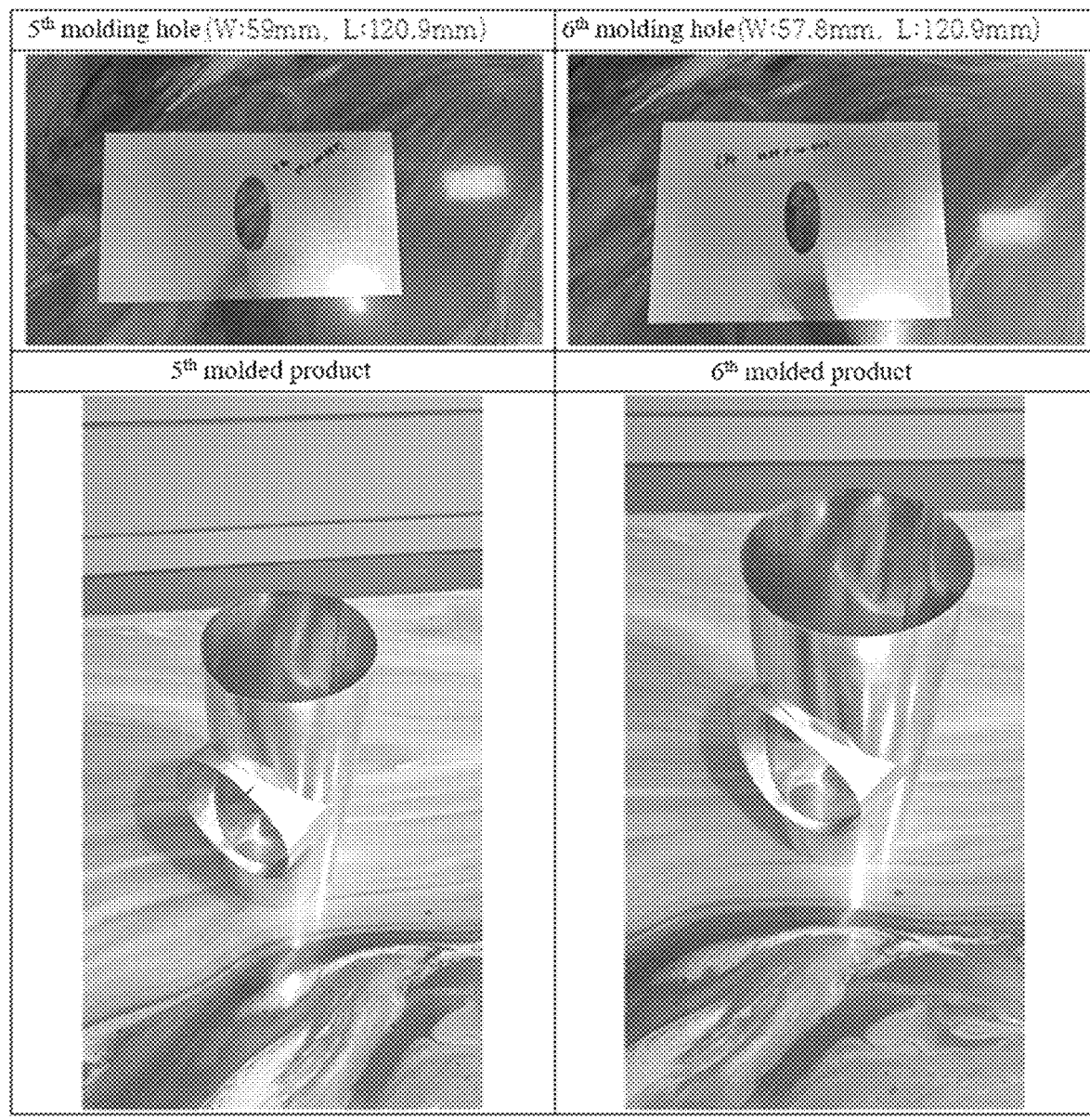

[FIG. 17]
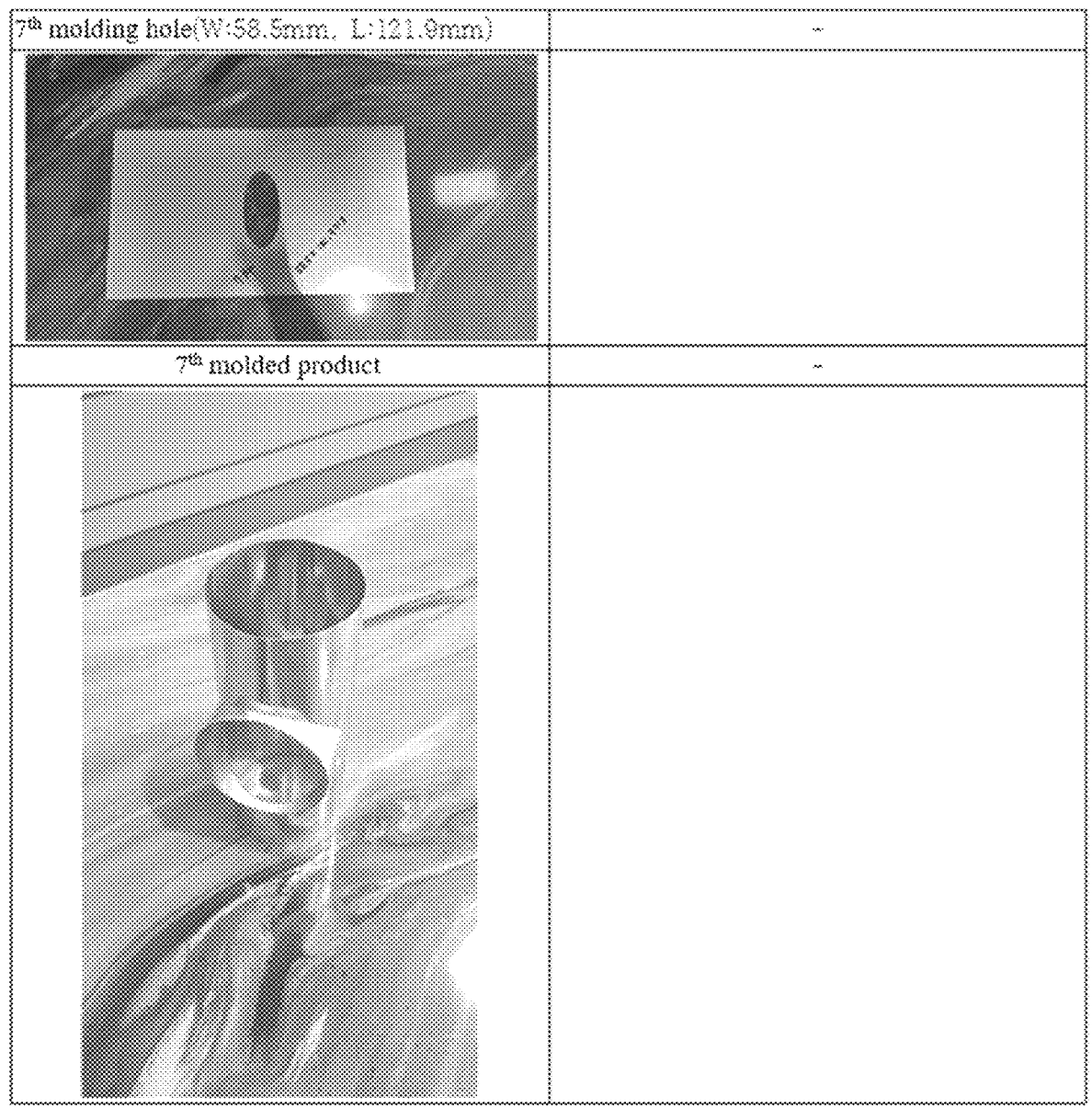

TEE TYPE CONNECTOR PIPE MANUFACTURING METHOD

CROSS REFERENCE TO RELATED APPLICATIONS

This application is a U.S. National Stage Application of International Application No. PCT/KR2023/008340, filed on Jun. 16, 2023, which claims the benefit under 35 USC 119(a) and 365(b) of Korean Patent Application No. 10-2022-0081721, filed on Jul. 4, 2022, in the Korean Intellectual Property Office, the entire disclosure of which is incorporated herein by reference for all purposes.

TECHNICAL FIELD

The present invention relates to a tee type connector pipe manufacturing method, comprising: a step S-1, in which an oval-shaped molding hole (11) is drilled in the center of a metal plate (10), and then the metal plate (10) is roll-formed into a tube-shaped straight pipe (20); a step S-2, settling down a jig pipe (100), which has a seating place (110) formed in the inner side and a circular-shaped insertion hole (120) formed in the center, in a lower mold (200); a step S-3, positioning a molding stone (300), which has a curved outer circumferential surface, into the seating place (110) through the insertion hole (120): a step S-4, positioning the straight pipe (20) to the outer side of the jig pipe (100): a step S-5, combining and securing an upper mold (400) with the lower mold (200); a step S-6, combining the molding stone (300) with a shaft (510) of a press device (500) that has passed through a pass-through hole (410) formed in the upper mold (400); a step S-7, lifting the shaft (510) to forcibly pass the molding stone (300) through the molding hole (11) to form a molding pipe part (31), then to form a tee type pipe (30); and a step S-8, disuniting the upper mold (400) and the lower mold (200), and separating the tee type pipe (30) from the jig pipe (100)

BACKGROUND TECHNIQUE

In general, a pipe used in air conditioning facilities is a passageway for fluids such as water, oil, or gas, depending on its purpose.

Such a pipe is generally formed and used in a linear shape, and between a pipe and a pipe, a branched pipe such as an elbow, a T-shape, a Y-shape, or a reducer is coupled and used to distribute or merge the flow of fluids.

By using such a branched pipe, it is not necessary to arrange and connect a plurality of linear pipes in a T-shape, a Y-shape, or other shapes, thereby shortening working hours, reducing material use, and being widely used in public facilities or houses due to relatively simple maintenance and repair.

Such a branched pipe is generally injection-molded through a forming device or a mold device, and an example of embodiments, "Mold device for molding a tee type joint pipe (Korean Patent No. 10-1444743)" of the following Patent Document 1 is disclosed.

The "mold device for molding a tee type joint pipe" of the Patent Document 1 comprising: a first mold frame, in which a space portion having a shape corresponding to an outline of the tee type joint pipe is formed therein: a second mold frame, in which a space portion having a shape corresponding to an outline of the tee type joint pipe is formed therein, and configured to be mutually retractable by connecting to the first mold frame with multiple guide rods: an inner mold part, positioned in the space portion and configured to be spaced apart from the inner rim of the first mold frame and the second mold frame by a predetermined distance, so as to form a cavity which is a space in which the tee type joint pipe is formed when the first mold frame and the second mold frame are closed; one or more injection holes, formed in the first mold frame or the second mold frame for injecting a softened resin composition into the cavity. The space portion is composed of a transverse space part and a longitudinal space part connected to one side of the transverse space part, is characterized by a formation of a fluid flow guide frame at the intersection of the transverse space part and the longitudinal space part. Therefore, a joint pipe can be easily manufactured for various pipe diameters, and a branch pipe having various pipe diameters can be manufactured with a single mold device, which has the advantage of reducing production costs and manufacturing time.

However, the "mold device for molding a tee type joint pipe" of the Patent Document 1 has a problem in that the joint pipe is not molded as a single piece due to its structure, so the connection part is weak.

RELATED ART DOCUMENTS

Patent Documents

Patent Document 1 Korean Patent Registration No. 10-1444743

CONTENT OF INVENTION

Problem to Solve

The present invention is directed to solving the problems described above, and the purpose of the present invention is to provide a tee type connector pipe manufacturing method: manufacturing an integrated tee type pipe by forming a molding pipe part with pulling a periphery of a molding hole and protruding it to the outward direction through a pressing device and a molding device, while forming a molding hole of a predetermined shape on an upper side of a straight pipe; and manufacturing a tee type pipe that ensures robustness, productivity, and workability, accordingly.

Solution to the Problem

In order to solve the above problem, the tee type connector pipe manufacturing method, according to the present invention, comprising: a step S-1, in which an oval-shaped molding hole (11) is drilled in the center of a metal plate (10), and then the metal plate (10) is roll-formed into a tube-shaped straight pipe (20): a step S-2, settling down a jig pipe (100), which has a seating place (110) formed in the inner side and a circular-shaped insertion hole (120) formed in the center, in a lower mold (200): a step S-3, positioning a molding stone (300), which has a curved outer circumferential surface, into the seating place (110) through the insertion hole (120): a step S-4, positioning the straight pipe (20) to the outer side of the jig pipe (100): a step S-5, combining and securing an upper mold (400) with the lower mold (200): a step S-6, combining the molding stone (300) with a shaft (510) of a press device (500) that has passed through a pass-through hole (410) formed in the upper mold (400): a step S-7, lifting the shaft (510) to forcibly pass the molding stone (300) through the molding hole (11) to form a molding pipe part (31), then to form a tee type pipe (30);

and a step S-8, disuniting the upper mold (400) and the lower mold (200), and separating the tee type pipe (30) from the jig pipe (100).
Characterized in that:

In addition, in the step S-1, a diameter (d) of the straight pipe (20) is formed of 147 mm~149 mm, the molding hole (11)'s a minor axis diameter is formed of 57.8 mm~58.5 mm, and a major axis diameter (c) is formed of 120.9 mm~121.9 mm.

In addition, in the step S-1, the ratio of the diameter (d) of the straight pipe (20) to the minor axis diameter (b) of the molding hole (11) is 1:0.4, and the ratio of the minor axis diameter (b) to the major axis diameter (c) of the molding hole (11)'s is 1:2.

In addition, in the step S-3, a radius (r) of an outer circumferential surface of the molding stone (300) is same to a radius (d) of the straight pipe (20).

In addition, in the step S-7, the press device (500) raises the molding stone (300) to tension around the molding hole (11) at a pressure of 1 TON and a speed of 0.05 m/s, and then forms the molding pipe part (31).

Effect of Invention

As described above, the present invention has the advantage of manufacturing an integrated tee type pipe by forming a molding pipe part with pulling a periphery of a molding hole and protruding it to the outward direction through a pressing device and a molding device, while forming a molding hole of a predetermined shape on an upper side of a straight pipe; and manufacturing a tee type pipe that ensures robustness, productivity, and workability, accordingly.

DESCRIPTION OF DRAWING

FIG. 1 to FIG. 10 are flowcharts sequentially showing a tee type connector pipe manufacturing method according to a preferred embodiment of the present invention.

FIG. 11 is an internal view showing a jig pipe, a straight pipe, and a molding stone positioned between upper and lower molds in a tee type connector pipe manufacturing method according to a preferred embodiment of the present invention.

FIG. 12 is a view showing a state of a metal plate and a straight pipe

FIG. 13 is a front view showing an appearance of a molding stone in a configuration of a tee type connector pipe manufacturing method according to a preferred embodiment of the present invention.

FIG. 14 to FIG. 17 are exemplary views showing a state of a tee type pipe manufactured through a tee type connector pipe manufacturing method according to a preferred embodiment of the present invention.

DETAILED DESCRIPTION OF PREFERRED EMBODIMENTS

Hereinafter, with reference to the attached drawings, a tee type connector pipe manufacturing method according to an embodiment of the present invention will be described in detail. First, it should be noted that, in the drawings, the same components or parts are denoted by the same reference numerals wherever possible. In describing the present invention, a detailed description of related known functions or configurations will be omitted in order to avoid obscuring the gist of the present invention.

Hereinafter, referring to FIG. 1 to FIG. 10, a tee type connector pipe manufacturing method according to a preferred embodiment of the present invention will be described.

As shown in FIG. 1, at first, a metal plate (10) made of SUS or other metal materials is prepared. At this time, an oval-shaped molding hole (11) is drilled in the center of the metal plate (10) by using a laser processing device or a punching device. Thereafter, the metal plate (10) is roll-formed into a tube-shaped straight pipe (20) (step S-1).

At this time, the direction of a major axis diameter (c, L) of the molding hole (11) is located in the same direction as the longitudinal direction of the straight pipe (20).

Next, as shown in FIG. 2, a jig pipe (100) that guides to form the straight pipe (20) is settled down on a lower mold (200) (step S-2). At this time, a seating place (110) formed as a space is formed in the inner side of the jig pipe (100), and an insertion hole (120) is formed in a circular shape on the outer circumferential surface of the center side, so that a molding stone (300) to be described later is inserted and withdrawn.

In this case, it is preferable that the insertion hole (120) is formed to have a larger diameter than the molding hole (11).

Next, as shown in FIG. 3 or 4, the molding stone (300) having a curved outer circumferential surface is positioned in the seating place (110) through the insertion hole (120) (step S-3). At this time, as shown in FIG. 13, it is preferable that a radius (r) of the outer circumferential surface of the molding stone (300) is formed to be same to the radius (d) of the straight pipe (20).

Next, as shown in FIG. 5 or 6, after lifting the jig pipe (100) from the lower mold (200), the straight pipe (20) is coupled to the outer side of the jig pipe (100), and then the jig pipe (100) is settled down on the lower mold (200) again (step S-4). At this time, the insertion hole (120) and the molding hole (11) are installed so that their centers are at the same position vertically.

In this case, since the insertion hole (120) is formed to be larger than the molding hole (11), as shown in FIG. 12, the molding hole (11) is located on the inner side of the insertion hole (120) when viewed in a plan view.

Next, as shown in FIG. 7, an upper mold (400) and the lower mold (200) are combined and secured (step S-5). In this case, a pass-through hole (410) having the same diameter as the diameter (d) of the straight pipe (20) is formed through the upper mold (400).

Thereafter, as shown in FIG. 11, a shaft (510) of a press device (500) passes through the pass-through hole (410) and is combined to the upper portion of the molding stone (300) (step S-6).

Next, as shown in FIG. 8, the press device (500) is driven to raise the shaft (510) so that the molding stone (300) is forcibly passed through the molding hole (11). Accordingly, as a portion of the area around the molding hole (11) is pulled upward, the corresponding portion protrudes outward to form a molding pipe part (31), and as a result, a tee type pipe (30) having a T-shape is formed (step S-7).

Next, as shown in FIG. 9 or 10, the upper mold (400) and the lower mold (200) are separated from each other, and the tee type pipe (30) is separated from the jig pipe (100) (step S-8).

Through the above process, it is possible to mold the straight pipe (20) into the tee type pipe (30).

Meanwhile, FIG. 14 to FIG. 17 are photographs of an embodiment in which the molding pipe part (31) is formed by tensioning around the molding hole (11) through the molding stone (300) with driving forces of the press device (500) for each size of a minor axis diameter (b, W) and a major axis diameter (c, L) of the molding hole (11).

At this time, an operating condition of the press device (500) is set to raise the molding stone (300) to tension around the molding hole (11) at a pressure of 1 TON and a speed of 0.05 m/s, and the diameter (d) of the straight pipe (20) is set to be 147 mm.

As a result, for a first molded product set to be a minor axis diameter (W) of 105 mm and a major axis diameter (L) of 130 mm for a molding hole (11), a second molded product set to be a minor axis diameter (W) of 69 mm and a major axis diameter (L) of 120 mm for a molding hole (11), a third molded product set to be a minor axis diameter (W) of 77 mm and a major axis diameter (L) of 137 mm for a molding hole (11), a fourth molded product set to be a minor axis diameter (W) of 64 mm and a major axis diameter (L) of 124 mm for molding hole (11), a fifth molded product set to be a minor axis diameter (W) of 59 mm and a major axis diameter (L) of 120.9 mm for a molding hole (11), it was found that the outer surface of each molding pipe part (31) was torn or severe bending occurred at the uppermost end.

Meanwhile, in the case of a sixth molded product set to be a minor axis diameter (W) of 57.8 mm and a major axis diameter (L) of 120.9 mm for a molding hole (11) and a seventh molded product set to be a minor axis diameter (W) of 58.5 mm and major axis diameter (L) of 121.9 mm for a molding hole (11), each of the molding pipe parts (31) was correctly formed without any problems.

That is, while the diameter (d) of the straight pipe (20) is set to be 147 mm~149 mm, when the minor axis diameter (b) and the major axis diameter (c) for the molding hole (11) are set to be 57.8 mm~58.5 mm and 120.9 mm~121.9 mm respectively, it can be seen that the molding pipe part (31) is formed in a parallel state at the uppermost end without causing peripheral tearing.

In terms of a proportion, when the ratio between the diameter (d) of the straight pipe (20) and the minor axis diameter (B) of the molding hole (11) is 1:0.4, and the ratio between the molding hole's the minor axis diameter (B) and the major axis diameter (c) is 1:2, it can be seen that the molding pipe part (31) is formed in a good quality Optimal embodiments are disclosed in the drawings and specifications. Although specific terms are used herein, they are used only for the purpose of explaining the present disclosure and are not used to limit the meaning or scope of the present disclosure described in the claims. Accordingly, those skilled in the art will understand that various modifications and other equivalent embodiments are possible therefrom. Accordingly, the true technical protection scope of the present disclosure should be determined by the technical spirit of the attached claims.

REFERENCE SIGNS LIST

10: Metal plate
11: Molding hole
20: Straight pipe
30: Tee type pipe
31: Molding pipe part
100: Jig pipe
200: Lower mold
300: Molding stone
400: Upper mold
500: Press device
510: Shaft
b, W: Minor axis diameter of a molding hole
c, L: Major axis diameter of a molding hole

What is claimed is:

1. A tee type connector pipe manufacturing method, comprising:
    a step S-1, in which an oval-shaped molding hole (11) is drilled in the center of a metal plate (10), and then the metal plate (10) is roll-formed into a tube-shaped straight pipe (20);
    a step S-2, settling down a jig pipe (100), which has a seating place (110) formed in an inner side and a circular-shaped insertion hole (120) formed in a center, in a lower mold (200);
    a step S-3, positioning a molding stone (300), which has a curved outer circumferential surface, into the seating place (110) through the insertion hole (120);
    a step S-4, positioning the straight pipe (20) to an outer side of the jig pipe (100);
    a step S-5, combining and securing an upper mold (400) with the lower mold (200);
    a step S-6, combining the molding stone (300) with a shaft (510) of a press device (500) that has passed through a pass-through hole (410) formed in the upper mold (400);
    a step S-7, lifting the shaft (510) to forcibly pass the molding stone (300) through the molding hole (11) to form a molding pipe part (31), then to form a tee type pipe (30); and
    a step S-8, disuniting the upper mold (400) and the lower mold (200), and separating the tee type pipe (30) from the jig pipe (100)
    wherein, in the step S-1, a ratio between the diameter (d) of the straight pipe (20) and the minor axis diameter (b) of the molding hole (11) is 1:0.4, and a ratio between the minor axis diameter (b) and the major axis diameter (c) of the molding hole (11) is 1:2, and
    wherein, in the step S-3, a radius (r) of an outer circumferential surface of the molding stone (300) is same to a radius (d) of the straight pipe (20).

2. The tee type connector pipe manufacturing method of claim 1, wherein, in the step S-1, a diameter (d) of the straight pipe (20) is formed of 147 mm~149 mm, and the molding hole is formed with a minor axis diameter (b) of 57.8 mm~58.5 mm and a major axis diameter of 120.9 mm~121.9 mm.

3. The tee type connector pipe manufacturing method according to claim 2, wherein, in the step S-7, the press device (500) raises the molding stone (300) to tension around the molding hole (11) at a pressure of 1 TON and a speed of 0.05 m/s, and then forms the molding pipe part (31).

* * * * *